(12) United States Patent
Eun et al.

(10) Patent No.: US 11,494,478 B2
(45) Date of Patent: Nov. 8, 2022

(54) USB CONNECTOR-FREE DEVICE AND METHOD

(71) Applicant: GLS CO., LTD., Daejeon (KR)

(72) Inventors: Ki-Chan Eun, Daejeon (KR); Ki-Dong Song, Daejeon (KR)

(73) Assignee: GLS CO., LTD., Daejeon (KR)

( * ) Notice: Subject to any disclaimer, the term of this patent is extended or adjusted under 35 U.S.C. 154(b) by 287 days.

(21) Appl. No.: 16/760,915

(22) PCT Filed: Nov. 3, 2017

(86) PCT No.: PCT/KR2017/012377
§ 371 (c)(1),
(2) Date: May 1, 2020

(87) PCT Pub. No.: WO2019/088322
PCT Pub. Date: May 9, 2019

(65) Prior Publication Data
US 2020/0311243 A1  Oct. 1, 2020

(30) Foreign Application Priority Data
Nov. 2, 2017 (KR) .................. 10-2017-0145451

(51) Int. Cl.
*G06F 21/35* (2013.01)
*H02J 50/10* (2016.01)
(Continued)

(52) U.S. Cl.
CPC .............. *G06F 21/35* (2013.01); *G06F 1/16* (2013.01); *G06F 13/385* (2013.01); *G06F 21/44* (2013.01);
(Continued)

(58) Field of Classification Search
CPC .......... G06F 21/35; G06F 1/16; G06F 13/385; G06F 21/44; H02J 50/10; H04B 1/3827; H04B 1/40; H04B 5/00
See application file for complete search history.

(56) References Cited

U.S. PATENT DOCUMENTS

| 7,133,375 B1 * | 11/2006 | Molla ................... H04W 88/10 370/335 |
| 10,598,722 B1 * | 3/2020 | Spinner .............. G01R 31/2868 |

(Continued)

FOREIGN PATENT DOCUMENTS

| CN | 105659689 A | 6/2016 |
| JP | 2014-030349 A | 2/2014 |

(Continued)

OTHER PUBLICATIONS

International Search Report of PCT/KR2017/012377 dated Jul. 23, 2018 [PCT/ISA/210].

(Continued)

*Primary Examiner* — Henry Tsai
*Assistant Examiner* — Aurangzeb Hassan
(74) *Attorney, Agent, or Firm* — Sughrue Mion, PLLC

(57) ABSTRACT

Provided are USB connector-free device and method, the device comprising: a host computer 10; a mobile device 20; and an ultra-high-speed module 30, wherein the host computer 10 comprises a USB module, the mobile device (20) comprises: a mobile device USB module (21) connected to the USB module of the host computer (10); mobile device hardware (22) matching with a hardware layer of the mobile device USB module (21); and a mobile device RF module (23) wirelessly matching with the mobile device hardware (22), and the ultra-high-speed module (30) comprises: an ultra-high-speed RF module (31) wirelessly communicating with the mobile device RF module (23); ultra-high-speed module hardware (32) matching with the ultra-high-speed (Continued)

RF module (31) by hardware; and a memory module (33) performing wire-communication with the ultra-high-speed module hardware (32).

6 Claims, 9 Drawing Sheets

(51) Int. Cl.
    *G06F 1/16*     (2006.01)
    *G06F 13/38*     (2006.01)
    *G06F 21/44*     (2013.01)
    *H04B 1/3827*     (2015.01)
    *H04B 1/40*     (2015.01)
    *H04B 5/00*     (2006.01)

(52) U.S. Cl.
    CPC ............ *H02J 50/10* (2016.02); *H04B 1/3827* (2013.01); *H04B 1/40* (2013.01); *H04B 5/00* (2013.01)

(56) References Cited

U.S. PATENT DOCUMENTS

| | | | | |
|---|---|---|---|---|
| 2007/0239929 A1* | 10/2007 | Chen | ................ | G06F 3/0607 711/103 |
| 2010/0138572 A1 | 6/2010 | Rofougaran | | |
| 2015/0038084 A1* | 2/2015 | Dahan | ................ | H04W 4/80 455/41.2 |
| 2016/0205199 A1 | 7/2016 | Patil et al. | | |
| 2016/0258837 A1* | 9/2016 | Rastegar | ................ | G01M 7/08 |

FOREIGN PATENT DOCUMENTS

| | | | |
|---|---|---|---|
| KR | 10-2008-0064575 | A | 7/2008 |
| KR | 10-2009-0071855 | A | 7/2009 |
| KR | 10-1101414 | B1 | 1/2012 |
| KR | 10-1208649 | B1 | 12/2012 |
| KR | 10-2016-0044565 | A | 4/2016 |
| KR | 10-2016-0045845 | A | 4/2016 |
| KR | 10-1653604 | B1 | 9/2016 |
| WO | 2017/142211 | A1 | 8/2017 |

OTHER PUBLICATIONS

First Office Action dated May 7, 2021 from the China National Intellectual Property Administration in CN Application No. 201780097394.9.

Second Office Action dated Dec. 2, 2021 from the China National Intellectual Property Administration in CN Application No. 201780097394.9.

* cited by examiner

[OOK Transmitter]

[OOK Receiver]

USB CONNECTOR-FREE DEVICE AND METHOD

CROSS REFERENCE TO RELATED APPLICATIONS

This application is a National Stage of International Application No. PCT/KR2017/012377, filed Nov. 3, 2017, claiming priority to Korean Patent Application No. 10-2017-0145451, filed Nov. 2, 2017, the contents of which are incorporated by reference herein in their entirety.

TECHNICAL FIELD

The present invention relates to USB connector-free device and method and, more particularly, to USB connector-free device and method in which a hardware layer is wirelessly connected using a USB protocol, without a USB connector.

BACKGROUND ART

A USB connector performs USB connection of a host computer 10 and a mobile device 20. The USB connection connects the host computer 10 and the mobile device 20 by a wire, and the host computer 10 and the mobile device 20 communicate through a USB cable. The communication distance between the host computer 10 and the mobile device 20 is finitely determined by length of a USB cable. In addition, when there is no USB cable, there is a problem that the host computer 10 and the mobile device 20 may not be able to communicate with each other.

Wireless communication without using a wired cable may be applied between the host computer 10 and the mobile device 20 but has a problem of being not compatible with the USB connection.

Documents of Related Art (Patent Document 1) Korean Patent No. KR 10-1101414, WIRELESS MODEM DEVICE.

DISCLOSURE

Technical Problem

Accordingly, the present invention has been made keeping in mind the above problems occurring in the prior art, and an objective of the present invention is to provide USB connector-free device and method providing a wireless communication module compatible with USB connection without using a USB connector.

Technical Solution

In order to accomplish the above objective, the present invention may provide a USB connector-free device, the device including: a mobile device 20 including: a mobile device USB module 21 connected to a USB module of a host computer 10; mobile device hardware 22 matching with a hardware layer of the mobile device USB module 21; and a mobile device RF module 23 wirelessly matching with the mobile device hardware 22.

In addition, the present invention may provide a USB connector-free device, the device including: a mobile device 20 including: a wireless power supply device 24 including: an oscillator; an amplifier; a matching circuit; and a coil, wherein the oscillator generates a radio frequency, the amplifier amplifies the radio frequency, the matching circuit matches impedance between the coil and the amplifier, and the coil transmits wireless power.

The present invention may provide a USB connector-free device, the device including: a host computer 10; a mobile device 20; and an ultra-high-speed module 30, wherein the host computer 10 may include a USB module, the mobile device 20 may include: a mobile device USB module 21 connected to the USB module of the host computer 10; mobile device hardware 22 matching with a hardware layer of the mobile device USB module 21; and a mobile device RF module 23 wirelessly matching with the mobile device hardware 22, and the ultra-high-speed module 30 may include: an ultra-high-speed RF module 31 wirelessly communicating with the mobile device RF module 23; ultra-high-speed module hardware 32 matching with the ultra-high-speed RF module 31 by hardware; and a memory module 33 performing wire-communication with the ultra-high-speed module hardware 32.

In addition, the mobile device RF module 23 and the ultra-high-speed RF module 31 may be interlocked with a wireless power supply device from which power is wirelessly supplied thereto.

In addition, the mobile device 20 may read authentication information from the memory module 33 of the ultra-high-speed module 30, thereby processing authentication, and when the authentication is successful, the mobile device and the ultra-high-speed module 30 may perform USB-RF communication using the USB module and the RF module.

In addition, the memory module 33 of the ultra-high-speed module 30 may process authentication of an ID and a password of the mobile device 20 and authenticate the password, updated by a key generation routine, and the updated password of the mobile device 20, with the key generation routine, which updates the authenticated password, and the mobile device 20 may log in to the memory module 33 with the ID and the password, update the password with the key generation routine, and log in with an updated password at next login.

In addition, the present invention may provide an operation method of a USB connector-free device, the method including: including a USB module by a host computer 10; connecting to a USB module of the host computer 10 by a mobile device USB module 21; matching with the hardware layer of the mobile device USB module 21 by mobile device hardware 22; wirelessly matching with the mobile device hardware 22 by a mobile device RF module 23, and wirelessly communicating with the mobile device RF module 23 by an ultra-high-speed RF module 31; matching with the ultra-high-speed RF module 31 by an ultra-high-speed module hardware 32 by hardware; and performing wire-communication with the ultra-high-speed module hardware 32 by a memory module 33.

In addition, the mobile device RF module 23 and the ultra-high-speed RF module 31 may further include interlocking with a wireless power supply device from which wireless power is supplied.

In addition, a mobile device 20 may further include: reading authentication information from the memory module 33 of an ultra-high-speed module 30, thereby processing authentication; and performing USB-RF communication using the USB module and the RF module by the mobile device 20 and the ultra-high-speed module 30 when the authentication is successful.

In addition, the processing authentication may include: processing authentication of an ID and a password of the mobile device 20, and authenticating the password, updated by a key generation routine, and the updated password of the mobile device 20, with the key generation routine which updates the authenticated password, by the memory module 33 of the ultra-high-speed module 30; and logging in to the memory module 33 with the ID and the password, updating the password with the key generation routine, and logging in with an updated password at next login, by the mobile device 20.

Advantageous Effects

When the USB connector-free device and method according to the present invention as above are used, the mobile device 20 and the ultra-high-speed module 30 can perform USB connection without using a USB connector by performing USB wireless communication using a USB module and an RF module.

In addition, there is an advantage in that the RF module is supplied with power wirelessly and uses the power as power required for wireless communication.

In addition, the authentication information is read from the memory module 33 of the ultra-high-speed module 30, authentication processing is performed, and when the authentication is successful, USB RF communication can be performed.

MODE FOR INVENTION

Unless defined otherwise, all terms used herein, including technical or scientific terms, have the same meaning as commonly understood by a person skilled in the art to which the present invention pertains. Terms such as those defined in a commonly used dictionary should be interpreted as having meanings consistent with meanings in the context of related technologies, and should not be interpreted as ideal or excessively formal meanings unless explicitly defined in the present application.

Hereinafter, exemplary embodiments of the present invention will be described in detail with reference to the accompanying drawings.

Figure 1:
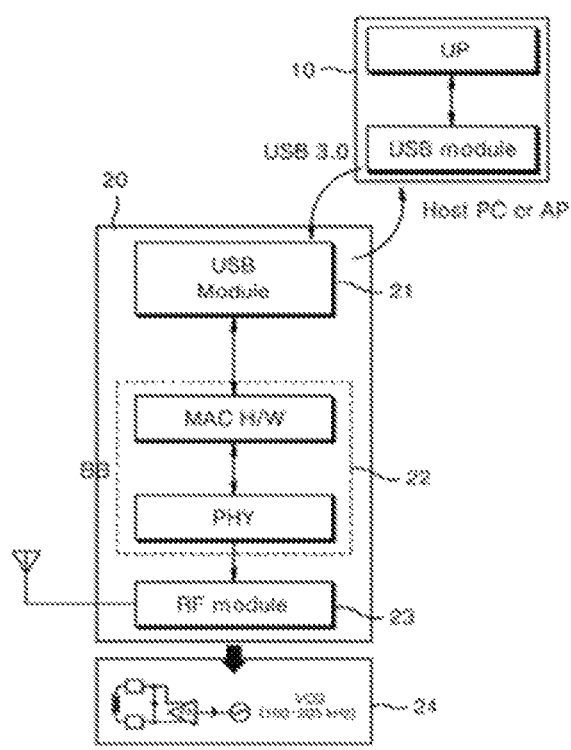
FIG. 1 is an exemplary view showing a mobile device.

FIG. 1 is an exemplary view showing a mobile device.

A mobile device 20 includes a mobile device USB module 21 that communicates with a USB module of a host computer 10; mobile device hardware 22 that matches with a hardware layer of the mobile device USB module 21; and a mobile device RF module 23 that wirelessly matches with the mobile device hardware 22. In an embodiment, the mobile device 20 may operate alone without intervention of the host computer 10.

The mobile device USB module 21 communicates with the USB module of the host computer 10.

The mobile device hardware 22 matches with the hardware layer of the mobile device USB module 21.

The mobile device RF module 23 wirelessly matches with the mobile device hardware 22.

A wireless power supply device 24 of the mobile device 20 is composed of an oscillator, an amplifier, a matching circuit, and a coil. Here, the oscillator generates a radio frequency, the amplifier amplifies the radio frequency, the matching circuit matches impedance between the coil and the amplifier, and the coil transmits wireless power The USB connector-free device including the mobile device 20 and the host computer 10 may be a portable electronic device such as a smartphone, tablet, notebook, or the like that provides computing functions. As such, the USB connector-free device includes the mobile device 20, whereby the portable electronic device does not require a connector for charging and data transmission so that there is an effect such that the appearance is improved and the method of use is very easy.

In addition, the USB connector may include various contact-type connector methods used in the smartphones, and, for example, may be a USB-C type for an Android smartphone and be a Lightning cable method for an iPhone.

Figure 2:
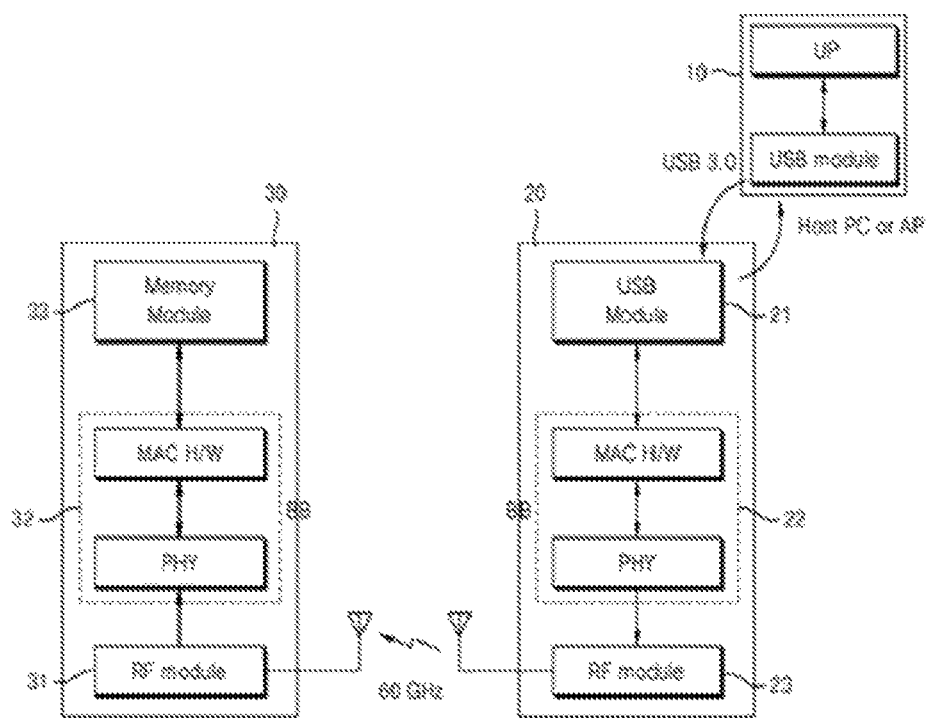
FIG. 2 is a block diagram showing a configuration of a USB connector-free device.

FIG. 2 is a block diagram showing a configuration of a USB connector-free device.

The USB connector-free device is composed of a host computer 10, a mobile device 20, and an ultra-high-speed module 30.

The host computer 10 includes a USB module.

The mobile device 20 includes a mobile device USB module 21 that communicates with a USB module of a host computer 10; mobile device hardware 22 that matches with a hardware layer of the mobile device USB module 21; and a mobile device RF module 23 that wirelessly matches with the mobile device hardware 22.

The mobile device USB module 21 communicates with the USB module of the host computer 10.

The mobile device hardware 22 matches with the hardware layer of the mobile device USB module 21.

The mobile device RF module 23 wirelessly matches with the mobile device hardware 22.

The ultra-high-speed module 30 includes an ultra-high-speed RF module 31 that wirelessly communicates with a mobile device RF module 23; ultra-high-speed module hardware 32 that matches with the ultra-high-speed RF module 31 by hardware; and a memory module 33 that performs wire-communication with the ultra-high-speed module hardware 32.

The ultra-high-speed RF module 31 wirelessly communicates with the mobile device RF module 23.

The ultra-high-speed module hardware 32 matches with the ultra-high-speed RF module 31 through the hardware.

The memory module 33 performs the wire-communication with the ultra-high-speed module hardware 32.

The mobile device 20 reads authentication information from the memory module 33 of the ultra-high-speed module 30, thereby processing authentication, and when the authentication is successful, the mobile device 20 and the ultra-high-speed module 30 perform USB-RF communication using the USB module and the RF module.

The memory module 33 of the ultra-high-speed module 30 processes authentication of an ID and a password of the mobile device 20 and authenticates the password, updated by a key generation routine, and the updated password of the mobile device 20, with the key generation routine, which updates the authenticated password The mobile device 20 logs in to the memory module 33 with the ID and the password, updates the password with the key generation routine, and logs in with an updated password at next login.

An authentication module of the ultra-high-speed module 30 and the mobile device 20 processes authentication while updating the password with the key generation routine at login. The key generation routine may update the password using a time value as a seed value.

Figure 3:
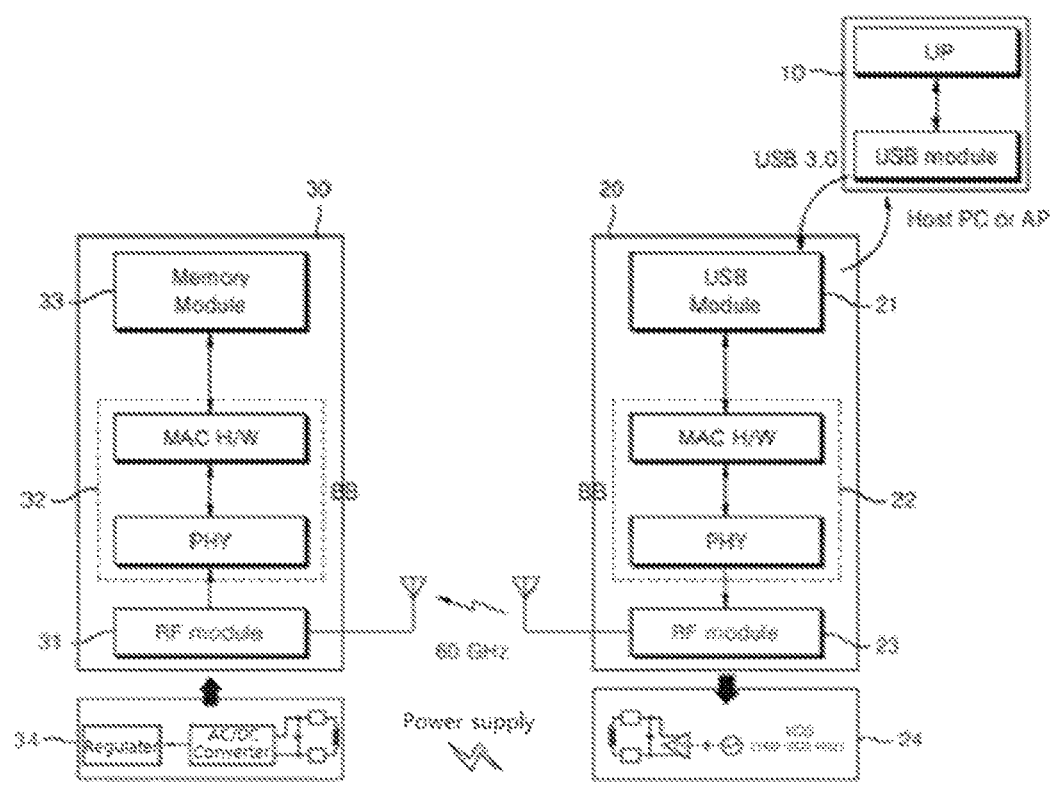
FIG. 3 is a block diagram showing another embodiment of a USB connector-free device.

FIG. 3 is a block diagram showing another embodiment of a USB connector-free device.

The USB connector-free device is composed of a host computer 10, a mobile device 20, and an ultra-high-speed module 30.

The host computer 10 includes a USB module.

A mobile device 20 includes a mobile device USB module 21 that communicates with a USB module of a host computer 10; mobile device hardware 22 that matches with a hardware layer of the mobile device USB module 21; and a mobile device RF module 23 that wirelessly matches with the mobile device hardware 22.

The mobile device USB module 21 communicates with the USB module of the host computer 10.

The mobile device hardware 22 matches with the hardware layer of the mobile device USB module 21.

The mobile device RF module 23 wirelessly matches with the mobile device hardware 22.

The ultra-high-speed module 30 includes an ultra-high-speed RF module 31 that wirelessly communicates with a mobile device RF module 23; ultra-high-speed module hardware 32 that matches with the ultra-high-speed RF module 31 by hardware; and a memory module 33 that performs wire-communication with the ultra-high-speed module hardware 32.

The ultra-high-speed RF module 31 wirelessly communicates with the mobile device RF module 23.

The ultra-high-speed module hardware 32 matches with the ultra-high-speed RF module 31 through the hardware.

The memory module 33 performs the wire-communication with the ultra-high-speed module hardware 32.

The mobile device RF module 23 and the ultra-high-speed RF module 31 are interlocked with a wireless power supply device from which power is wirelessly supplied thereto.

The wireless power supply device interlocking with the mobile device 20 transmits power to a wireless power supply device of the ultra-high-speed module 30. The wireless power supply device of the ultra-high-speed module 30 may receive wireless power of the mobile device 20 and use the wireless power as device power.

The wireless power supply device 24 of the mobile device 20 is composed of an oscillator, an amplifier, a matching circuit, and a coil. The oscillator generates a radio frequency, the amplifier amplifies the radio frequency, the matching circuit matches impedance between the coil and the amplifier, and the coil transmits the wireless power.

The wireless power supply device 34 of the ultra-high-speed module 30 is composed of a coil, a matching circuit, an AC/DC converter, and a regulator. The coil receives the wireless power, and the matching circuit matches impedance between the coil and the AC/DC converter. The AC/DC converter converts wireless power to DC power. The regulator makes DC power uniform and supplies the power to the ultra-high-speed module 30.

Figure 4:
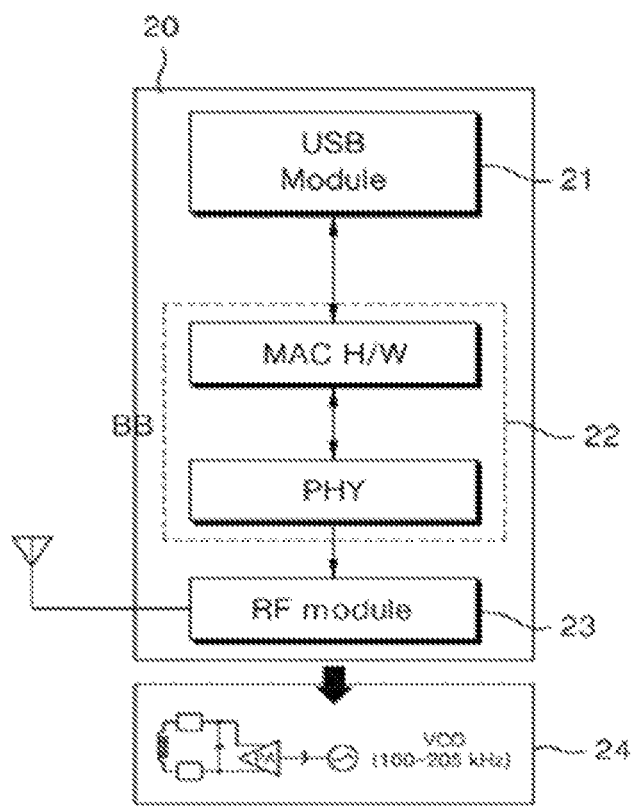
FIG. 4 is a block diagram showing a configuration of a mobile device 20.

FIG. 4 is a block diagram showing a configuration of a mobile device 20.

A mobile device 20 includes a mobile device USB module 21 that communicates with a USB module of a host computer 10; mobile device hardware 22 that matches with a hardware layer of the mobile device USB module 21; and a mobile device RF module 23 that wirelessly matches with the mobile device hardware 22.

The mobile device RF module 23 is interlocked with a wireless power supply device from which power is wirelessly supplied thereto.

The mobile device USB module 21 communicates with the USB module of the host computer 10.

The mobile device hardware 22 matches with the hardware layer of the mobile device USB module 21.

The mobile device RF module 23 wirelessly matches with the mobile device hardware 22.

The mobile device 20 may display RF status information on a status display window. The RF status information includes wireless signal intensity and data error rate. A user may acknowledge the radio status between the mobile device 20 and the ultra-high-speed module 30 by viewing the RF status information.

Figure 5:
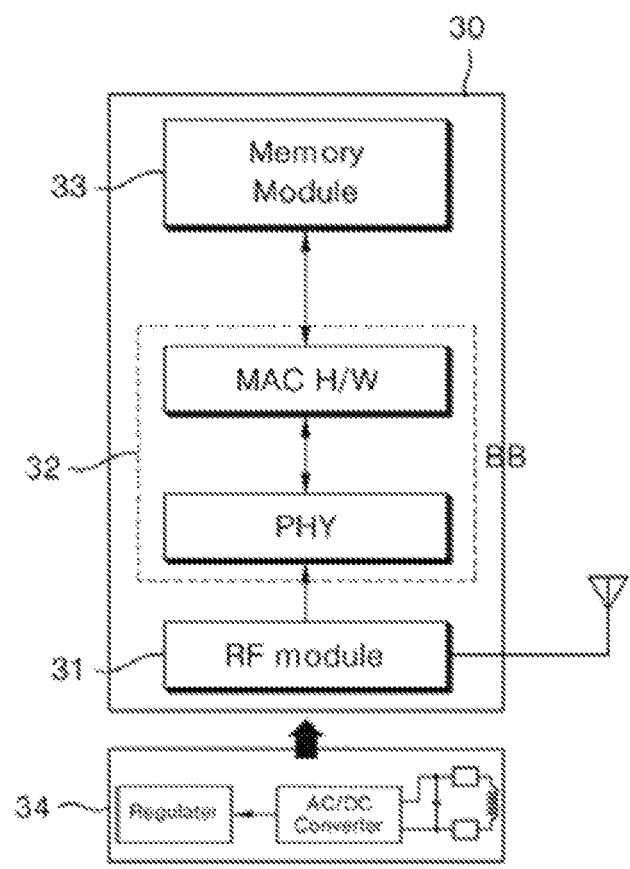
FIG. 5 is a block diagram showing a configuration of an ultra-high-speed module 30.

FIG. 5 is a block diagram showing a configuration of an ultra-high-speed module 30.

The ultra-high-speed module 30 includes an ultra-high-speed RF module 31 that wirelessly communicate with the mobile device RF module 23; ultra-high-speed module hardware 32 that matches with the ultra-high-speed RF module 31 by hardware; and a memory module 33 that performs wire-communication with the ultra-high-speed module hardware 32.

The ultra-high-speed RF module 31 is interlocked with a wireless power supply device from which power is wirelessly supplied thereto.

The ultra-high-speed RF module 31 wirelessly communicates with the mobile device RF module 23.

The ultra-high-speed module hardware 32 matches with the ultra-high-speed RF module 31 by hardware.

The memory module 33 performs wire-communication with the ultra-high-speed module hardware 32.

Figure 6:
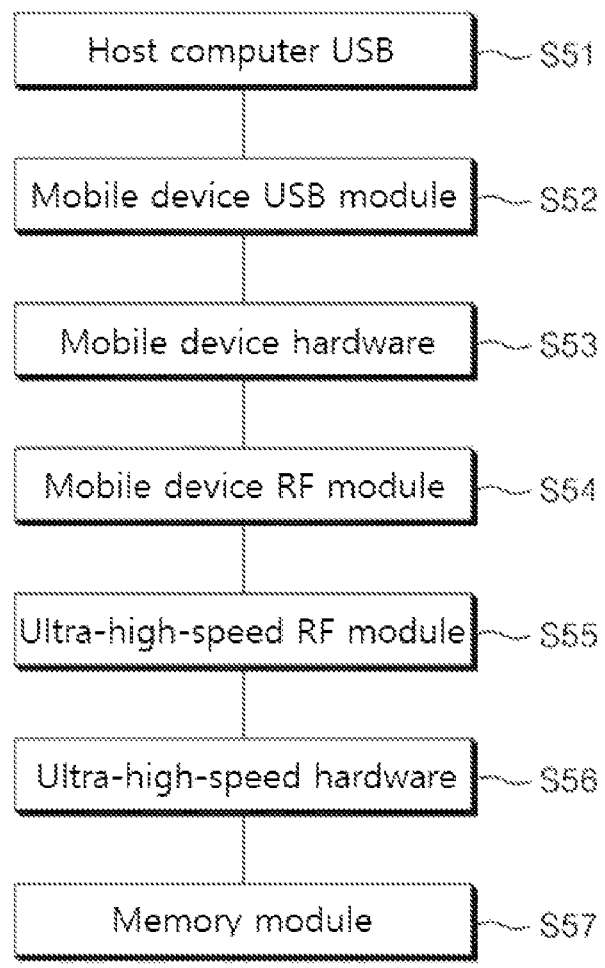
FIG. 6 is an operation flowchart of an operation method of the USB connector-free device.

FIG. 6 is an operation flowchart of an operation method of the USB connector-free device.

A USB connector-free method will be described.

The USB connector-free device includes a program memory for storing a program, a data memory for storing data, and a processor for executing the program.

Looking at the data stored in the program memory, the program memory includes: including a USB module by a host computer 10 at S51, communicating with a USB module of the host computer 10 by a mobile device USB module 21 at S52; matching with the hardware layer of the mobile device USB module 21 by mobile device hardware 22 at S53; wirelessly matching with the mobile device hardware by a mobile device RF module 23 at S54, wirelessly communicating with the mobile device RF module 23 by the ultra-high-speed RF module 31 at S55; matching with the ultra-high-speed RF module 31 by the ultra-high-speed module hardware 32 by hardware at S56; and performing wire-communication with the ultra-high-speed module hardware 32 by the memory module 33 at S57.

The USB connector-free device executes the program stored in the program memory by the processor, and such an operation is as follows.

The procedures executed in the USB connector-free device are described in time series order.

The USB connector-free device is composed of a host computer 10, a mobile device 20, and an ultra-high-speed module 30.

The host computer 10 includes the USB module.

The mobile device 20 includes a mobile device USB module 21 that communicates with the USB module of the host computer 10; mobile device hardware 22 that matches with the hardware layer of the mobile device USB module 21; and a mobile device RF module 23 that wirelessly matches with the mobile device hardware 22.

The mobile device USB module 21 communicates with the USB module of the host computer 10.

The mobile device hardware 22 matches with the hardware layer of the mobile device USB module 21.

The mobile device RF module 23 wirelessly matches with the mobile device hardware 22.

The ultra-high-speed module 30 includes an ultra-high-speed RF module 31 that wirelessly communicate with the mobile device RF module 23; ultra-high-speed module hardware 32 that matches with the ultra-high-speed RF module 31 by hardware; and a memory module 33 that performs wire-communication with the ultra-high-speed module hardware 32.

The ultra-high-speed RF module 31 wirelessly communicates with the mobile device RF module 23.

The ultra-high-speed module hardware 32 matches with the ultra-high-speed RF module 31 by hardware.

The memory module 33 performs wire-communication with the ultra-high-speed module hardware 32.

The mobile device RF module 23 and the ultra-high-speed RF module 31 are interlocked with a wireless power supply device from which power is wirelessly supplied thereto.

The wireless power supply device interlocking with the mobile device 20 transmits power to the wireless power supply device of the ultra-high-speed module 30. The wireless power supply device of the ultra-high-speed module 30 may receive wireless power of the mobile device 20 and use the wireless power as the device power.

A wireless power supply device 24 of the mobile device 20 is composed of an oscillator, an amplifier, a matching circuit, and a coil. The oscillator generates a radio frequency, the amplifier amplifies the radio frequency, the matching circuit matches the impedance between the coil and the amplifier, and the coil transmits the wireless power.

The wireless power supply device 34 of the ultra-high-speed module 30 is composed of a coil, a matching circuit, an AC/DC converter, and a regulator. The coil receives the wireless power, and the matching circuit matches the impedance between the coil and the AC/DC converter. The AC/DC converter converts wireless power into DC power. The regulator makes DC power uniform and supplies the power to the ultra-high-speed module 30.

Figure 7:
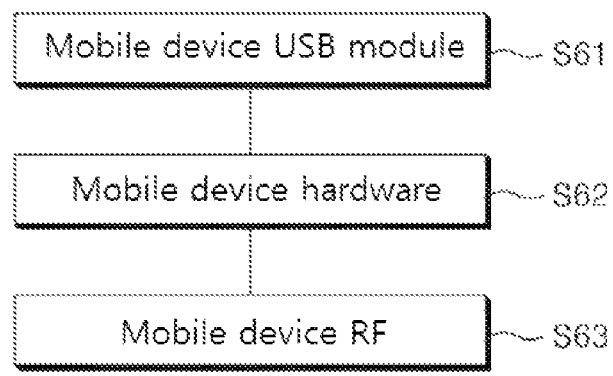
FIG. 7 is an operation flowchart of an operation method of the USB connector-free device of the mobile device 20.

FIG. 7 is an operation flowchart of an operation method of the USB connector-free device of the mobile device 20.

An operation method of the USB connector-free device of the mobile device is described.

The mobile device includes a program memory for storing a program, a data memory for storing data, and a processor for executing the program.

Looking at the data stored in the program memory, the program memory includes: communicating with a USB module of the host computer 10 by a mobile device USB module 21 at S61; matching with the hardware layer of the mobile device USB module 21 by mobile device hardware 22 at S62; wirelessly matching with the mobile device hardware by a mobile device RF module 23 at S63.

The mobile device executes the program stored in the program memory by the processor, and such an operation is described as follows.

The procedures executed in the mobile device are described in time series order.

The mobile device RF module 23 is interlocked with a wireless power supply device from which power is wirelessly supplied thereto.

The mobile device USB module 21 communicates with the USB module of the host computer 10.

The mobile device hardware 22 matches with the hardware layer of the mobile device USB module 21.

The mobile device RF module 23 wirelessly matches with the mobile device hardware 22.

The mobile device 20 may display RF status information on a status display window. The RF status information includes wireless signal intensity and data error rate. The user may acknowledge the radio status between the mobile device 20 and the ultra-high-speed module 30 by viewing the RF status information.

Figure 8:
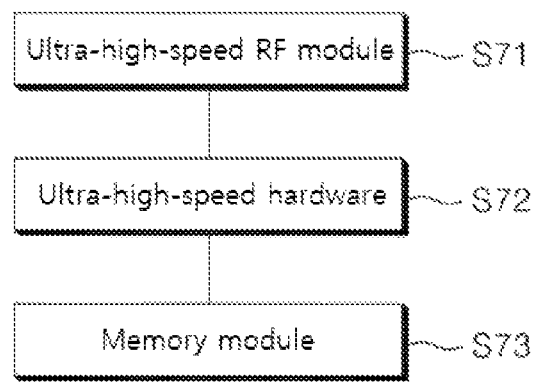
FIG. 8 is an operation flowchart of an operation method of the USB connector-free device of the ultra-high-speed module 30.

FIG. 8 is an operation flowchart of an operation method of the USB connector-free device of the ultra-high-speed module 30.

An operation method of the USB connector-free device of the ultra-high-speed module is described.

The ultra-high-speed module includes a program memory for storing a program, a data memory for storing data, and a processor for executing the program.

Looking at the data stored in the program memory, the program memory includes: wirelessly communicating with the mobile device RF module 23 by the ultra-high-speed RF module 31 at S71; matching with the ultra-high-speed RF module 31 by the ultra-high-speed module hardware 32 by hardware at S72; and performing wire-communication with the ultra-high-speed module hardware 32 by the memory module 33 at S73.

The ultra-high-speed module executes the program stored in the program memory by the processor, and such an operation is described as follows.

The procedures executed in the ultra-high-speed module are described in time series order.

The ultra-high-speed RF module 31 is interlocked with a wireless power supply device from which power is wirelessly supplied thereto.

The ultra-high-speed RF module 31 wirelessly communicates with the mobile device RF module 23.

The ultra-high-speed module hardware 32 matches with the ultra-high-speed RF module 31 by hardware.

The memory module 33 performs wire-communication with the ultra-high-speed module hardware 32.

Figure 9:
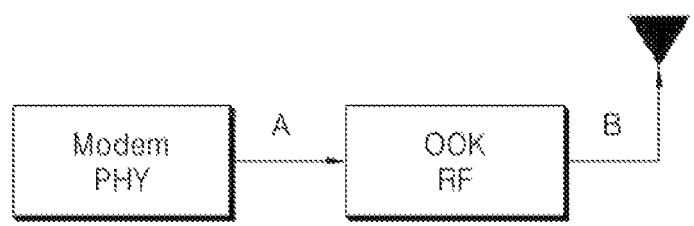
FIG. 9 shows exemplary views showing a wireless communication module used in the ultra-high-speed module 30 and the mobile device 20.
Figure 9:
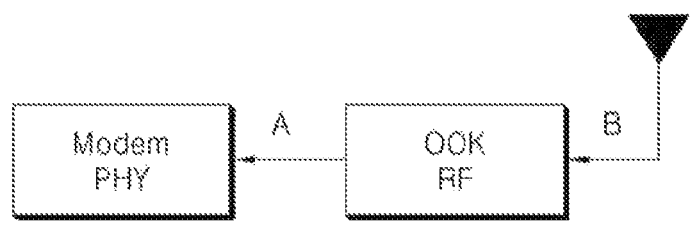

FIG. 9 shows exemplary views showing a wireless communication module used in the ultra-high-speed module 30 and the mobile device 20.

The wireless communication module uses an on-off keying (OOK) modulation method to regulate transmission speed and includes a configuration of an OOK transmitter and an OOK receiver for this purpose.

The transmitter of the OOK RF transmits a carrier wave when an input signal is 1 and transmits in a form of a no signal when an input signal is 0, and the receiver reversely performs the processes. The transmitter regulates a clock according to the transmission speed, thereby changing the data transmission speed, and the clock and data are restored from the received signal in the clock data recovery (CDR) circuit of the receiver.

In one embodiment, the CDR circuit may be implemented by constructing the data and clock into a feedback circuit consisting of a phase detector (PD), a low-pass filter (LPF), and a voltage controlled oscillator (VCO) at an input terminal.

In addition, the transmitter may regulate the clock input to the OOK transmitter into a desired phase using a phase locked loop (PLL), thereby regulating the data transmission speed.

The wireless communication module may use a wireless personal area network (WPAN) as an ultra-high-speed proximity communication method.

In one embodiment, the wireless communication module follows IEEE 802.15.3e: High-Rate close proximity (HRCP) point to point communication and may use a millimeter wave band of 60 GHz, 70 GHz, and 80 GHz. In an exemplary embodiment, the wireless communication module can use a 60 GHz frequency. In this case, the wireless communication module may have transmission speeds of up to 7 Gbps and 14 Gbps.

Although described above with reference to the preferred embodiment of the present invention, those skilled in the art will appreciate that the invention may be modified and changed in a variety of ways without departing from the spirit and scope of the invention as set forth in the claims below.

[Description of the Reference Numerals in the Drawings]

| | | | |
|---|---|---|---|
| 10: | Host computer | 20: | Mobile device |
| 21: | Mobile device USB module | 22: | Mobile device hardware |
| 23: | Mobile device RF module | 30: | Ultra-high-speed module |
| 31: | Ultra-high-speed RF module | 32: | Ultra-high-speed module hardware |
| 33: | Memory module | | |

The invention claimed is:

1. A USB connector-free device, the device comprising:
a host computer (10);
a mobile device (20); and
an ultra-high-speed module (30), wherein the host computer (10) comprises a USB module,
the mobile device (20) comprises:
a mobile device USB module (21) connected to the USB module of the host computer (10);
mobile device hardware (22) matching with a hardware layer of the mobile device USB module (21); and
a mobile device RF module (23) wirelessly matching with the mobile device hardware (22), and
the ultra-high-speed module (30) comprises:
an ultra-high-speed RF module (31) wirelessly communicating with the mobile device RF module (23);
ultra-high-speed module hardware (32) matching with the ultra-high-speed RF module (31) by hardware; and
a memory module (33) performing wire-communication with the ultra-high-speed module hardware (32),
wherein the mobile device RF module (23) and the ultra-high-speed RF module (31) are interlocked with a wireless power supply device from which power is wirelessly supplied thereto,
wherein a wireless communication module used in the ultra-high-speed module (30) and the mobile device (20) use a millimeter wave band of 60 GHz, 70 GHz, and 80 GHz,
wherein the wireless communication module uses an on-off keying (OOK) modulation method to regulate a transmission speed and includes a configuration of an OOK transmitter and an OOK receiver,
wherein the OOK transmitter transmits a carrier wave when an input signal is 1 and transmits in a form of a no signal when the input signal is 0, and the OOK receiver reversely performs such processes,
wherein the OOK transmitter regulates a clock according to the transmission speed, thereby changing a data transmission speed, and the clock and data are restored from the received signal in a clock data recovery (CDR) circuit of the OOK receiver, and
wherein the OOK transmitter regulates a clock input to the OOK transmitter into a desired phase using a phase locked loop (PLL), thereby regulating the data transmission speed.

2. The device of claim 1, wherein the mobile device (20) reads authentication information from the memory module (33) of the ultra-high-speed module (30), thereby processing authentication, and when the authentication is successful, the mobile device (20) and the ultra-high-speed module (30) perform USB-RF communication using the USB module and the RF module.

3. The device of claim 2, wherein the memory module (33) of the ultra-high-speed module (30) processes authentication of an ID and a password of the mobile device (20) and authenticates the password, updated by a key generation routine, and the updated password of the mobile device (20), with the key generation routine, which updates the authenticated password, and the mobile device (20) logs in to the memory module (33) with the ID and the password, updates the password with the key generation routine, and logs in with an updated password at next login.

4. An operation method of a USB connector-free device, the method comprising:
comprising a USB module by a host computer (10),
connecting to a USB module of the host computer (10) by a mobile device USB module (21);
matching with the hardware layer of the mobile device USB module (21) by mobile device hardware (22);
wirelessly matching with the mobile device hardware (22) by a mobile device RF module (23), and
wirelessly communicating with the mobile device RF module (23) by an ultra-high-speed RF module (31);
matching with the ultra-high-speed RF module (31) by an ultra-high-speed module hardware (32) by hardware; and
performing wire-communication with the ultra-high-speed module hardware (32) by a memory module (33),
wherein the mobile device RF module (23) and the ultra-high-speed RF module (31) are interlocked with a wireless power supply device from which power is wirelessly supplied thereto,
wherein a wireless communication module used in the ultra-high-speed module (30) and the mobile device (20) use a millimeter wave band of 60 GHz, 70 GHz, and 80 GHz,
wherein the wireless communication module uses an on-off keying (OOK) modulation method to regulate a transmission speed and includes a configuration of an OOK transmitter and an OOK receiver,
wherein the OOK transmitter transmits a carrier wave when an input signal is 1 and transmits in a form of a no signal when the input signal is 0, and the OOK receiver reversely performs such processes,
wherein the OOK transmitter regulates a clock according to the transmission speed, thereby changing a data transmission speed, and the clock and data are restored from the received signal in a clock data recovery (CDR) circuit of the OOK receiver, and wherein the OOK transmitter regulates a clock input to the OOK transmitter into a desired phase using a phase locked loop (PLL), thereby regulating the data transmission speed.

5. The method of claim 4, wherein a mobile device 20 further comprising:

reading authentication information from the memory module (33) of an ultra-high-speed module (30), thereby processing authentication; and performing USB-RF communication using the USB module and the RF module by the mobile device (20) and the ultra-high-speed module (30) when the authentication is successful.

6. The method of claim 5, wherein the processing authentication comprises:

processing authentication of an ID and a password of the mobile device (20), and authenticating the password, updated by a key generation routine, and the updated password of the mobile device (20), with the key generation routine which updates the authenticated password, by the memory module (33) of the ultra-high-speed module (30); and logging in to the memory module (33) with the ID and the password, updating the password with the key generation routine, and logging in with an updated password at next login, by the mobile device (20).

\* \* \* \* \*